(12) United States Patent
Doehla (10) Patent No.: US 8,628,605 B2
(45) Date of Patent: Jan. 14, 2014

(54) FILTER BAG HAVING AN ADJUSTABLE BAND

(75) Inventor: James Roy Doehla, Pleasant Hill, MO (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 12/889,244

(22) Filed: Sep. 23, 2010

(65) Prior Publication Data
US 2012/0073434 A1 Mar. 29, 2012

(51) Int. Cl.
*B01D 46/02* (2006.01)

(52) U.S. Cl.
USPC ............... 95/273; 55/378; 55/502; 55/508; 55/DIG. 26

(58) Field of Classification Search
USPC ............ 55/361–382, 282–305, 334–335, 55/341.1–341.7, 385.1–385.8, 482–519; 95/19–22, 273–287; 96/189–192, 219, 96/233, 240–241, 310, 318, 337–347, 361, 96/371, 394, 398, 427; 210/323.1–347, 210/348–510
See application file for complete search history.

(56) References Cited

U.S. PATENT DOCUMENTS

| | | | | |
|---|---|---|---|---|
| 2,308,210 A | * | 1/1943 | Sahlin | 187/409 |
| 4,015,961 A | * | 4/1977 | Howard et al. | 55/378 |
| 4,244,718 A | * | 1/1981 | Noddin | 55/377 |
| 4,257,790 A | * | 3/1981 | Bergquist et al. | 55/379 |
| 4,272,263 A | * | 6/1981 | Hancock | 55/377 |
| 4,292,057 A | * | 9/1981 | Ulvestad et al. | 55/302 |
| 4,435,197 A | * | 3/1984 | Nijhawan et al. | 55/341.7 |
| 4,442,327 A | * | 4/1984 | West et al. | 200/51 R |
| 4,481,022 A | * | 11/1984 | Reier | 55/341.1 |
| 4,767,427 A | * | 8/1988 | Barabas et al. | 55/493 |
| 5,167,818 A | * | 12/1992 | Baert et al. | 210/321.87 |
| 5,209,845 A | * | 5/1993 | Sims | 210/232 |
| 5,308,369 A | * | 5/1994 | Morton et al. | 55/379 |
| 5,308,485 A | * | 5/1994 | Griffin et al. | 210/232 |
| 5,589,067 A | | 12/1996 | Rice | |
| 5,785,724 A | * | 7/1998 | Johnson | 55/377 |
| 6,375,698 B1 | * | 4/2002 | Clements et al. | 55/341.1 |
| 6,626,754 B2 | * | 9/2003 | Gebke et al. | 454/306 |
| 8,114,201 B2 | * | 2/2012 | Gebert et al. | 96/134 |
| 2008/0289153 A1 | * | 11/2008 | Bowater et al. | 24/274 R |
| 2009/0145094 A1 | * | 6/2009 | Johnson et al. | 55/341.2 |

FOREIGN PATENT DOCUMENTS

WO   WO 9525580 A1 * 9/1995

* cited by examiner

*Primary Examiner* — Duane Smith
*Assistant Examiner* — Thomas McKenzie
(74) *Attorney, Agent, or Firm* — Fletcher Yoder, P.C.

(57) ABSTRACT

A filter assembly system including, a filter bag having an opening, a seal coupled to the filter bag adjacent the opening, wherein the seal comprises a gasket band and a perforated metal band, and the perforated metal band is configured to bias the gasket band in a radial direction into a sealed position upon expansion or contraction of the perforated metal band.

22 Claims, 6 Drawing Sheets

FILTER BAG HAVING AN ADJUSTABLE BAND

BACKGROUND OF THE INVENTION

The subject matter disclosed herein relates to filter bags. More specifically, the disclosed subject matter relates to filter bags with an adjustable band.

Filter bags are used in a variety of equipment and applications, such as intake and exhaust filtration. For instance, a bag house may include multiple filter bags to filter undesirable particulates associated with an industrial system or plant. In particular, the bag house may be equipped with a sufficient number and size of filter bags to filter undesirable particulates from an entire factory, such as a cement factory. Unfortunately, the variety in hole sizes between bag houses and even within bag houses may require many different filter bag sizes to form consistent, dust tight seals. As a result, a custom fit filter bag may be required for a particular bag house.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a filter assembly with a filter bag having an opening, and a seal coupled to the filter bag adjacent the opening. The seal may include a gasket band and a perforated metal band. The perforated metal band is configured to bias the gasket band in a radial direction into a sealed position upon expansion or contraction of the perforated metal band.

In a second embodiment, a system includes a filter assembly with a filter bag having an opening, and an annular seal coupled to the filter bag around the opening. The annular seal may include a gasket ring generally concentric with a perforated biasing ring. The perforated biasing ring is configured to expand with plastic deformation in a circumferential direction to impart a first radial outward force on the gasket ring, and the gasket ring is configured to expand with elastic deformation in the circumferential direction to impart a second outward radial force toward a sealing interface in response to the first radial outward force.

In a third embodiment, a method includes expanding a perforated metal ring of a pulse jet filter bag with plastic deformation in a circumferential direction to impart a first radial outward force, and expanding a gasket ring of the pulse jet filter bag with elastic deformation in the circumferential direction to impart a second outward radial force toward a sealing interface in response to the first radial outward force.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to a filter bag that includes an adjustable band, such as a perforated metal band or mesh metal band. For example, the adjustable band may include one or more layers of gasket material in combination with one or more perforated metal bands. The filter bags employing the adjustable band may be found in a variety of industries, including food, pharmaceutical, chemical, paint, cement, plastic, alumina, combustion, and steel. Any location that needs filter bags may take advantage of the adjustable band filter bags. While the discussion below focuses on the filtering of gas, the disclosure is not intended to be limited in such a way. The disclosure may be equally applicable to industries that filter liquids. The adjustable band permits installation of a single sized filter bag in a variety of differently sized receptacles or internal mounts (e.g., tubing). For example, a bag house may include multiple locations for attachment of filter bags. Each of these locations, however, may have a slightly different sized hole compared to the other. Thus, a filter bag with an adjustable band enables use of a single size of filter bag rather than various custom sized filter bags, because the adjustable band is expandable and contractible to differently sized receptacles and internal mounts (e.g., tubing). Furthermore, the adjustable band may include an adjustable material that allows the adjustable band to conform to a variety of differently sized holes. In certain embodiments, a tool may be used to conform the adjustable band to differently sized holes in a bag house or other location. The use of an adjustable band on a filter bag may reduce the number of differently sized filter bags needed by bag houses; caused by the variations in tubesheet hole sizes.

Figure 1:
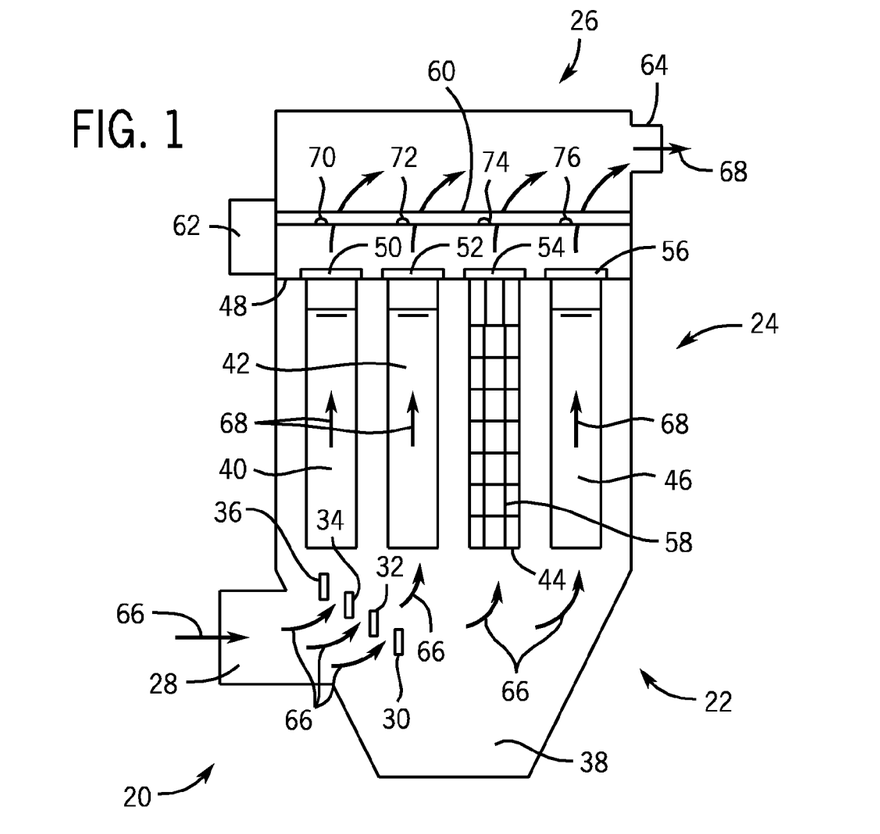
FIG. 1 is a cross-sectional side view of an embodiment of a bag house having filter bags with an adjustable band.

FIG. 1 is a cross-sectional view of an embodiment of a bag house wherein the filter bags may employ an adjustable band. The bag house 20 may include three sections: an air inlet section 22, an air cleaning section 24, and an air outlet section 26. The air inlet section 22 includes a dirty gas inlet 28; baffles 30, 32, 34, and 36; and a hopper 38. The air cleaning section 24 includes, filter bags 40, 42, 44, and 46; tube sheet 48; cage covers 50, 52, 54, and 56; and cages 58 within the filter bags 40, 42, 44, and 46. The air outlet section 26 includes blowpipe 60, compressed air header 62, and clean air outlet 64.

The bag house 20 allows dirty air 66 (e.g. air filled with particulates or debris) to enter the air inlet section 22 through the dirty gas inlet 28. The dirty air 66 after passing through the dirty gas inlet 28 contacts the baffles 30, 32, 34, and 36. The baffles 30, 32, 34, and 36 direct the dirty air in a direction towards the clean air outlet 64. As the dirty air 66 moves in the direction of the clean air outlet 64, it contacts the filter bags 40, 42, 44, and 46 (e.g., fabric filter bags). The filter bags 40, 42, 44, and 46 allow air to pass through the bags 40, 42, 44, and 46, while blocking the passage of undesirable particulates. Accordingly, as the dirty air 66 passes through the filter bags 40, 42, 44, and 46, particulates are left on the outside of the bags 40, 42, 44, and 46. The clean air 68 within the filter bags 40, 42, 44, and 46 then continues to progress through the filter bags 40, 42, 44, and 46 until reaching the outlet section 26, where the clean air is able to exit through the clean air outlet 64.

The filter bags 40, 42, 44, and 46 attach to the air cleaning section 24 with a respective adjustable band. The adjustable bands fit within apertures of the tube sheet 48. While in the present embodiment, the tube sheet 48 includes four apertures one for each filter bag 40, 42, 44, and 46, it is understood that the tube sheet 48 may include more apertures for example 10 to 100 apertures. The filter bags 40, 42, 44, and 46 maintain their shape under the force of the dirty air 66, because of cages 58 placed into the filter bags 40, 42, 44, and 46. The cages 58 may be made out of materials, such as steel or other metals, hard plastics, etc. that are able to resist deformation under the air pressure of the bag house 20. The cages 58 maintain the shape of the filter bags 40, 42, 44, and 46 under pressure from the dirty air 66 allowing the filter bags 40, 42, 44, and 46 to increase air filtration. The cages 58 attach to the cage covers 50, 52, 54, and 56. The cage covers 50, 52, 54, and 56 stabilize the filter bags during operation and facilitate insertion and removal of the cage 58 into and from the filter bags, facilitating the filter bag replacement process.

The filter bags 40, 42, 44, and 46 during use become covered in filtered particulate reducing the filtration ability of the filter bags 40, 42, 44, and 46. This problem is solved by periodically pulse jetting air into the filter bags 40, 42, 44, and 46 to knock particulate off the filter bags 40, 42, 44, and 46. As mentioned above, the outlet section 26 includes a blowpipe 60 and a compressed air header 62. The compressed air header 62 during pulse jet operations pulses compressed air into blowpipe 60. The blowpipe 60 then directs the pulsed compressed air through openings 70, 72, 74, and 76 into the filter bags 40, 42, 44, and 46. The pulses of compressed air shake the filter bags 40, 42, 44, and 46 sufficiently to knock particulate loose. The loose particulate may then drop into the hopper 38 of the air inlet section 22, where it may be removed from the bag house 20.

Figure 2:
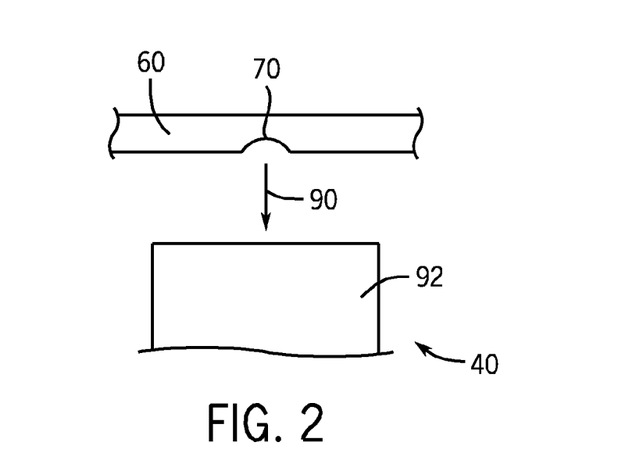
FIG. 2 is a partial side view of an embodiment of a blow-pipe configured to pulse air into a filter bag.

FIG. 2 is a sectional side view of an embodiment of a blowpipe 60 pulsing air into a filter bag 40. As discussed above, the air outlet section 26 includes a blowpipe 60 that blows compressed air into the filter bags 40, 42, 44, and 46. The pulsed air from the compressed air header 62 travels through the blowpipe 60 and exits through the blowpipe aperture 70 in the form of air pulses 90. These air pulses enter the filter bag 40 and cause it to shake, vibrate, etc. sufficiently to knock particulate loose from the outside surface 92 of the filter bag 40.

Figure 3:
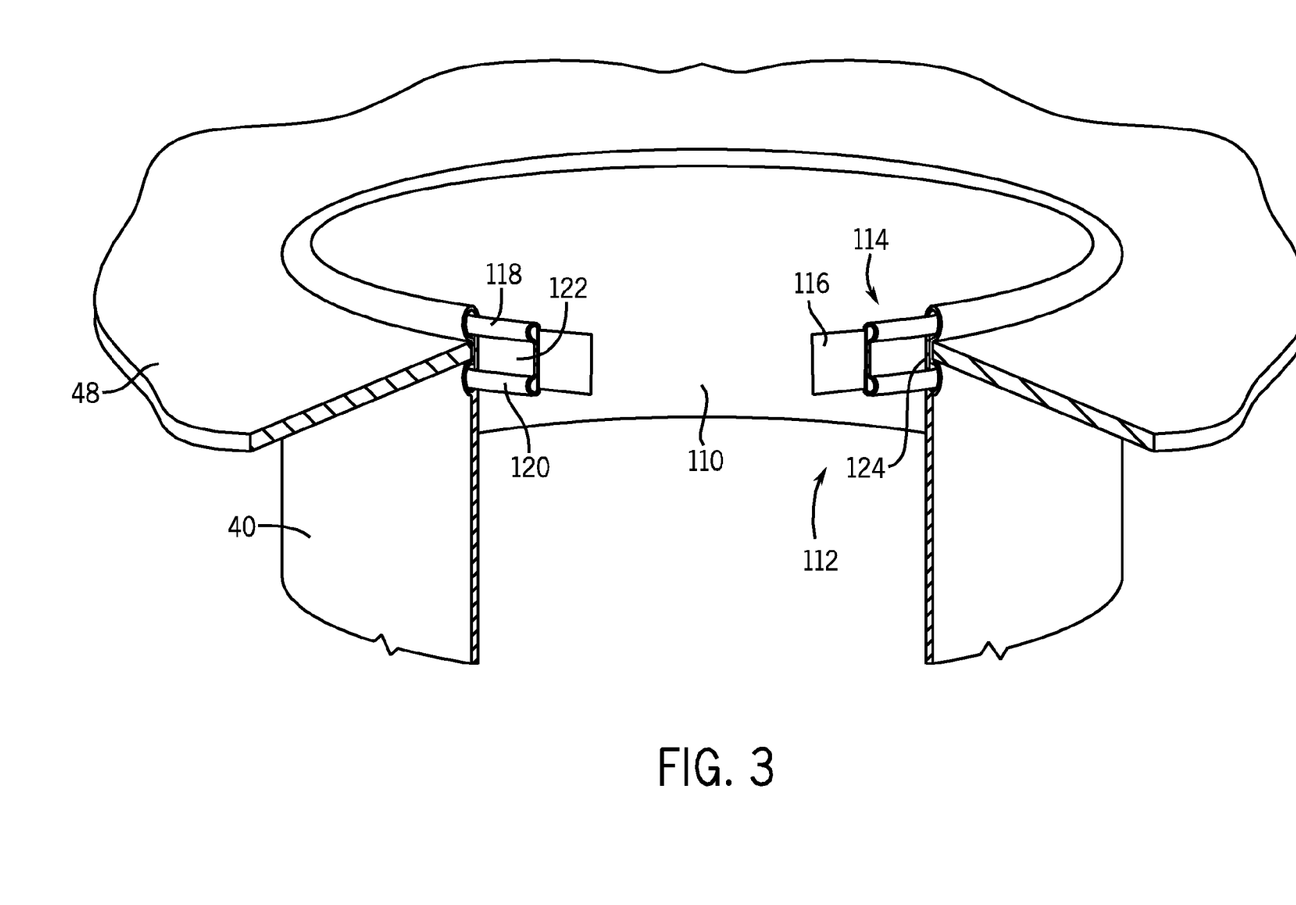
FIG. 3 is a partial cutaway perspective view of an embodiment of a filter bag with an adjustable band.

FIG. 3 is a partial cutaway perspective view of an embodiment of a filter bag 40 with an adjustable band 112. As more clearly seen in FIG. 3, the filter bag 40 connects to the tube sheet 48 around an aperture 110 with the adjustable band 112. The adjustable band 112 includes a flexible gasket ring/band 114 and an adjustable band portion 116, which are generally concentric with one another. The gasket ring/band 114 may further define two radial protrusions 118 and 120 and a radial recess 122. In certain embodiments, the gasket ring/band 114 may made out of an elastomer, rubber, plastic, fabric (e.g., polyester, nomex, acrylic fibers), woven fabrics (made out of fiberglass, polyester, nomex, or similar materials) or another resilient or compressible material, or any combination thereof. In contrast, the adjustable band portion 116 may be made of metal, such as a soft annealed stainless steel, low carbon steel, and aluminum with perforations. For example, the adjustable band portion 116 may have a pattern of uniform or non-uniform openings, such as circular, rectangular, triangular, or mesh-like openings. As discussed in detail below, during installation of the band 112, the gasket ring/band 114 may undergo elastic deformation while the adjustable band portion 116 (e.g., perforated metal ring) may undergo plastic deformation in a radial direction in response to a tool applied radial force.

The filter bag 40 attaches to the tube sheet 48 by fitting the tube sheet edge 124 in-between the two radial protrusions 118 and 120 and within radial recess 122. As discussed above, bag houses 20 may have multiple apertures that are not equal in size, yet the adjustable band portion 116 can expand or contract to fit the aperture. The adjustable band portion 116, as will be discussed in more detail below, is capable of expanding outwards or contracting inwards in response to a radial force provided by an installation tool. For example, the perforations of the adjustable band 116 may facilitate the expansion or contraction, while maintaining a considerable radial force for retention after the expansion or contraction. In this manner, the filter bags 40, 42, 44, and 46 may accommodate a variety of differently sized apertures. For example, during installation, the adjustable band 116 (e.g., perforated metal biasing ring) is configured to expand with plastic deformation in a circumferential direction to impart a first radial outward force on the gasket ring/band 114, and the gasket ring/band 114 is configured to expand with elastic deformation in the circumferential direction to impart a second outward radial force toward a sealing interface (e.g., tube sheet edge 124) in response to the first radial outward force.

Figure 4:
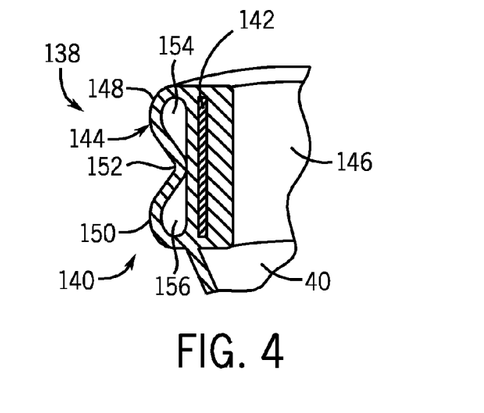
FIG. 4 is a partial cutaway perspective view of an embodiment of a filter bag with an adjustable band, illustrating an adjustable band portion within the adjustable band.

FIG. 4 is a partial cutaway perspective view of an embodiment of a filter bag 40 with an adjustable band 138, illustrating an adjustable band portion 142 within the adjustable band 138. The adjustable band 138 of FIG. 4 is similar to FIG. 3 in that it includes a gasket/ring band 140 and an adjustable band portion 142. The gasket/ring band 140 defines a front surface 144 and a flat rear surface 146. The front surface 144 defines two protrusions 148 and 150 that are generally convex in shape. In certain embodiments, the protrusions may not be convex in shape, but may be square-like, triangle-like, etc. The front surface 144 also defines a recess 152 between the two protrusions 148 and 150. In the present embodiment, the recess 152 is generally concave in shape, but in certain embodiments the recess 152 may be flat, triangle-like, etc. In certain embodiments, the recess 152 may be formed to match the edge of the tube sheet 48 or other location on which the filter bag 40 is positioned.

In the present embodiment, the adjustable band portion 142 is between the front face 144 and the rear face 146 of the gasket/ring band 140. The position of the adjustable band portion 142 behind the front face 144 creates an effective seal on the tube sheet 48 or another location. Thus, the adjustable band portion 142 during adjustment compresses the gasket/ring 140 against the tube sheet 48 or other location creating an airtight seal. The gasket/ring 140 may further define radial air pockets 154 and 156. These air pockets 154 and 156 may improve the ability of the adjustable band 138 to create an effective airtight seal by wrapping around an edge of a tube sheet 48 or other location.

The adjustable band portion 142 may form a ring/band out of a variety of materials, such as metal, plastic, or a combination thereof. In the illustrated embodiment, the adjustable band portion 142 is a perforated metal band made with a dead soft annealed stainless steel (e.g., Rockwell hardness 92-95, Brinell Hardness 201-217). In other embodiments, the adjustable band portion may be made out of a low carbon steel, aluminum, etc. These materials are useful in that they maintain sufficient strength after plastic deformation. This property assists in creating an effective seal for the filter bag 40, while simultaneously maintaining sufficient strength to withstand the pulse jetting and air filtration in the bag house 20.

Figure 5:
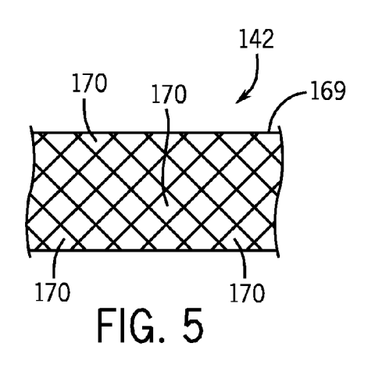
FIG. 5 is a front view of an embodiment of the adjustable band portion of the adjustable band as illustrated in FIG. 4.

FIG. 5 is a front view of an embodiment of the adjustable band portion 142 of the adjustable band 138 as illustrated in FIG. 4. The adjustable band portion 142 may be made with a material, thickness, and percentage of perforations to control its ability to expand and contract, while also providing a sufficient radial force for retaining the filter bag 40 after deformation. For example, the adjustable band portion 142 may include a greater number of perforations and a smaller thickness to enable a larger amount of expansion and contraction. By further example, the adjustable band portion 142 may include a lesser number of perforations and a larger thickness to maintain a greater radial force for retention after expansion or contraction. The material selection also may be varied to control the ability to expand or contract the adjustable band portion 142, the radial retention force after expansion or contraction, and so forth. The embodiment of FIG. 5 illustrates a metal substrate 169 with perforations 170 that are diamond-like in shape and that form a fence-like pattern, or mesh pattern. The larger the perforations 170 the easier it will be to plastically deform the adjustable band portion 142, while simultaneously the larger perforations 170 decrease the strength and retention force of the band 142. In the present embodiment, the perforations 170 are uniform in size and shape as well as distribution, while in other embodiments size, shape, distribution, etc. may vary depending on the design.

Figure 6:
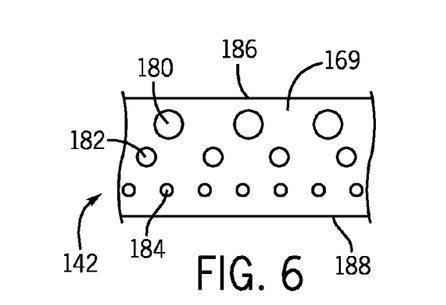
FIG. 6 is a front view of an embodiment of the adjustable band portion of the adjustable band as illustrated in FIG. 4.

FIG. 6 is a front view of an embodiment of the adjustable band portion 142 of the adjustable band 138 as illustrated in FIG. 4. FIG. 6 unlike FIG. 5 illustrates that the perforations may vary in size, shape and distribution over the adjustable band portion 142. Specifically, the adjustable band portion 142 includes three different sized perforations 180, 182, and 184. While FIG. 6 illustrates three differently sized circular perforations, other embodiments may include more or less differently sized perforations of equal or different shapes. Furthermore, while the perforations 180, 182, and 184 are organized into rows, in other embodiments the perforations may be organized in columns that alternate in a pattern or even have no pattern at all. Different perforation sizes and their placement on the adjustable band portion 142 may dictate how it will plastically deform when formed to a specific aperture. For instance, in the present embodiment, the adjustable band portion 142 may plastically deform more easily near a first side 186, while it may deform less easily near a second side 188. The band 142 will deform more easily because the perforations 180 are larger and therefore reduce the strength of the band 142 near the first side 186.

Figure 7:
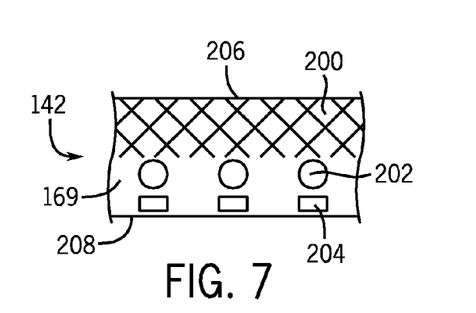
FIG. 7 is a front view of an embodiment of the adjustable band portion of the adjustable band as illustrated in FIG. 4.

FIG. 7 is a front view of an embodiment of the adjustable band portion 142 of the adjustable band 138 as illustrated in FIG. 4. FIG. 7 unlike FIG. 6 illustrates that the perforations may vary in shape and distribution over the adjustable band portion 142. Specifically, the adjustable band portion 142 includes three differently shaped perforations 200, 202, and 204. While in the present embodiment the perforations are diamond-shaped 200, circular 202, and rectangular 204, other embodiments may include other shapes (e.g., oval, rectangular, moon-shaped, oval-shaped, etc.). Other embodiments may include more than the three differently shaped perforations 200, 202, and 204 (e.g., 4 to 10 or more). Furthermore, while the perforations 200, 202, and 204 are organized into rows, in other embodiments the perforations may be organized into columns that alternate in pattern or even have no pattern at all.

The differently shaped perforations 200, 202, and 204 and their placement on the adjustable band portion 142 may dictate how it will plastically deform when formed to a specific aperture. For instance, in the present embodiment, the adjustable band portion 142 may plastically deform more easily near a first side 206, while it may deform less easily near a second side 208. The band 142 will deform more easily near the first side because the perforations 200 are more numerous and accordingly reduce the strength of the band 142 near the first side 206.

Figure 8:
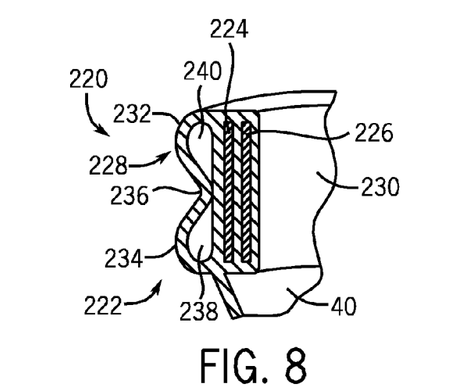
FIG. 8 is a partial cutaway perspective view of an embodiment of a filter bag with an adjustable band, illustrating a pair of adjustable band portions within the adjustable band.

FIG. 8 is a partial cutaway perspective view of an embodiment of a filter bag 40 with an adjustable band 220, illustrating a pair of adjustable band portions 224 and 226 within the adjustable band 220. The adjustable band 220 of FIG. 8 is similar to FIG. 4 in that it includes a gasket/ring band 222, but in contrast to FIG. 4 the adjustable band 220 includes two adjustable band portions 224 and 226. The gasket/ring band 222 defines a front surface 228 and a flat rear surface 230. The front surface 228 defines two protrusions 232 and 234 that are generally convex in shape. In certain embodiments, the protrusions 232 and 234 may not be convex in shape, but may be square-like, triangle-like, etc. The front surface 228 also defines a recess 236 between the two protrusions 232 and 234. In the present embodiment, the recess 236 is generally concave in shape, but in certain embodiments, the recess 236 may be flat, triangle-like, etc. In still other embodiments, the recess 236 may be formed to match the edge of the tube sheet 48 or other location on which the filter bag 40 is positioned.

In the present embodiment, the adjustable band portions 224 and 226 are between the front face 228 and the rear face 230 of the gasket/ring band 222. The position of the adjustable band portions 224 and 226 behind the front face 144 creates an effective seal on the tube sheet 48. Because the adjustable band portions 224 and 226 are behind the gasket/ring band 222 during installation the adjustable band portions 224 and 226 compresses the gasket/ring 222 against the tube sheet 48 or other location creating an airtight seal. The gasket/ring 222 may further define radial air pockets 238 and 240. These air pockets 238 and 240 may improve the ability of the adjustable band 220 to create an effective airtight seal, because they cause the gasket/ring band 222 to fold around the edge of the tube sheet 48.

Similar to the adjustable band portion 142 of FIG. 4, the adjustable band portions 224 and 226 of FIG. 8 each may form a ring/band out of a variety of materials, such as metal, plastic, or a combination thereof. In the illustrated embodiment, each adjustable band portion 224 and 226 is a perforated metal band made with a dead soft annealed stainless steel. In still other embodiments, the adjustable band portion 224 and 226 may be made out of aluminum, annealed low carbon steel, etc. These materials are useful in that they maintain sufficient strength after plastic deformation. Furthermore, the adjustable band portions 224 and 226 may have identical or different constructions. For example, the adjustable band portions 224 and 226 may be made with the same or different materials, the same or different thicknesses, the same or different percentage of perforations, the same or different pattern of perforations, or any combination thereof. By further example, one adjustable band portion may be characterized by a greater ductility, higher percentage of perforations, or smaller thickness to enable easier expansion and contraction, while the other adjustable band portion may be characterized by a lower ductility, lower percentage of perforations, or greater thickness to maintain a greater retention force after the expansion or contraction.

Figure 9:
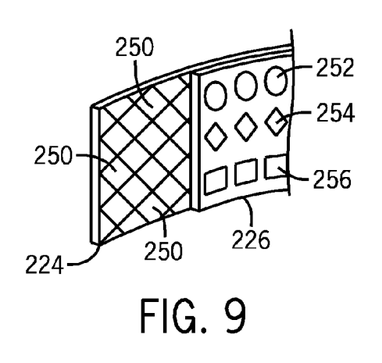
FIG. 9 is a partial perspective view of an embodiment of the pair of adjustable band portions in the adjustable band as illustrated in FIG. 8.

FIG. 9 is a partial perspective view of an embodiment of the pair of adjustable band portions 224 and 226 in the adjustable band 220 as illustrated in FIG. 8. As clearly seen in FIG. 9, the band portions 224 and 226 include a variety of different perforations. In the present embodiment, the band portion 224 has diamond like perforations 250 that form a fence-like pattern or uniform mesh. In other embodiments, band portion 224 may include different shaped perforations, patterns, sizes, etc. similar to the discussion with respect to FIGS. 5-7. In contrast, the band portion 226 includes perforations 252, 254, and 256 that are circular, diamond, and square shaped, thereby defining a non-uniform arrangement of perforations. Thus, the illustrated embodiment includes bands 224 and 226 of uniform perforations and non-uniform perforations in combination with one another. While each of the perforations 252, 254, and 256 in the band portion 226 differ in shape, they may also differ in size, pattern, etc. similar to the discussion above with respect to FIGS. 5-7. Furthermore, the size, pattern, and shape of the perforations 250 on the adjustable band portions 224 and 226 be identical or differ substantially from one another depending on the embodiment.

Figure 10:
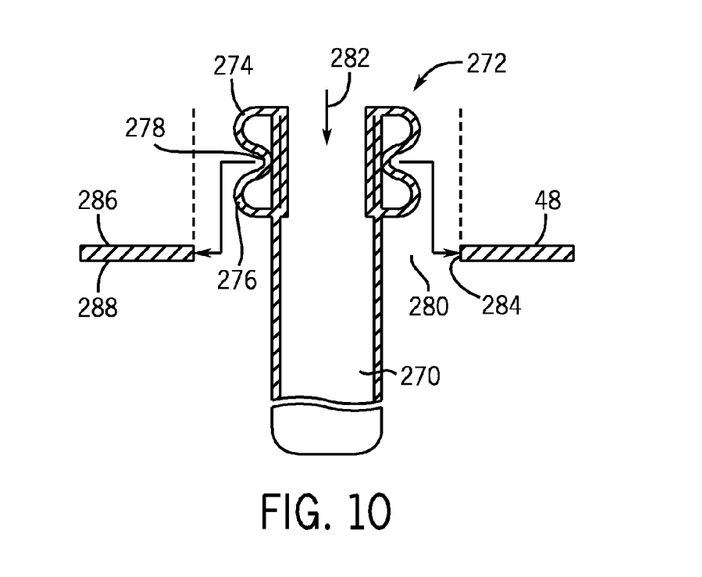
FIG. 10 is a cross-sectional view of an embodiment of a filter bag with an adjustable band prior to expansion into a mounting receptacle.

FIG. 10 is a cross-sectional view of an embodiment of a filter bag 270 with an adjustable band 272 prior to expansion into a mounting receptacle or aperture 280. As discussed above, the adjustable band 272 defines two protrusions 274 and 276 and a recess 278. In the present embodiment, the filter bag 270 is lowered into an aperture 280 of the tube sheet 48 in the direction of arrow 282. The filter bag 270 continues in this direction until the recess 278 aligns with the edge 284 of the tube sheet 48. As discussed above, the alignment of the tube sheet edge 284 with the recess 278 helps create an airtight seal by allowing the protrusions 274 and 276 to wrap around the edge 284. In this manner, the protrusion 274 contacts the top surface 286, while the protrusion 276 contacts the bottom surface 288 of the tube sheet 48, creating a more effective airtight seal.

Figure 11:
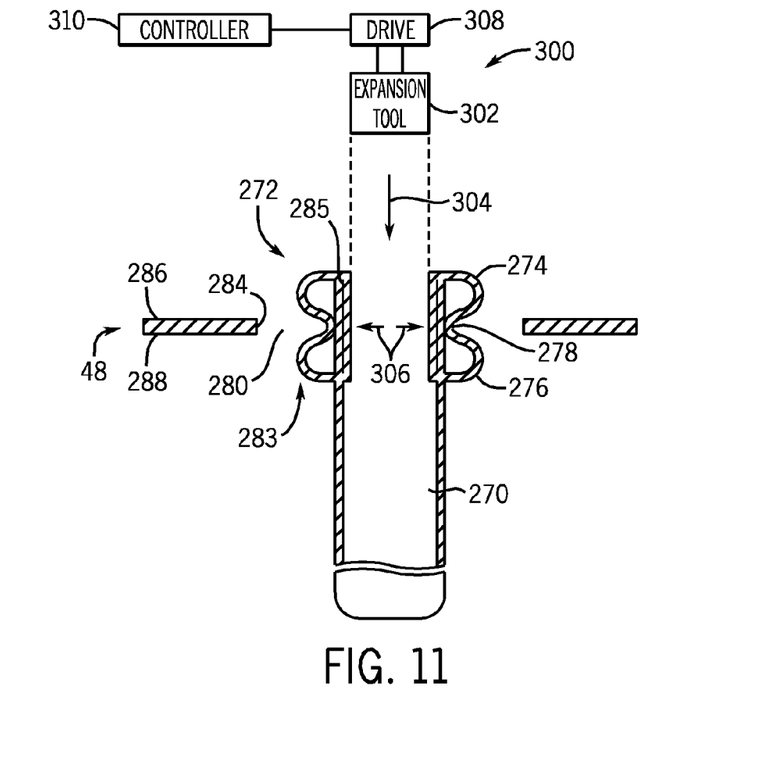
FIG. 11 is a cross-sectional view of an embodiment of the filter bag as illustrated in FIG. 10, illustrating an expansion tool used to expand the adjustable band into the mounting receptacle.

FIG. 11 is a cross-sectional view of an embodiment of the filter bag 270 as illustrated in FIG. 10, illustrating an expansion tool system 300 used to expand the adjustable band 272 into the mounting receptacle or aperture 280. As illustrated in FIG. 11, the aperture 280 is larger than the filter bag 270. Accordingly, the adjustable band 272 is included with the filter bag 270 to enable expansion of the adjustable band 272 into the oversized aperture 280, thereby creating an airtight seal between the tube sheet 48 and filter bag 270. After the filter bag 270 has been lowered into the proper position, i.e., the recess 278 is aligned with the edge 284, the expansion tool system 300 is then used to expand the adjustable band 272 radially outward toward the oversized aperture 280.

Specifically, the system 300 lowers an expansion tool 302 into the filter bag 270 in the direction of arrow 304. The expansion tool 302 is designed to plastically deform the adjustable band portion(s) 285 within the adjustable band 272, while elastically deforming the remaining portion (e.g., elastomeric or fabric portion) of the adjustable band 272. The expansion tool 302 deforms the adjustable band 272 in an outward radial direction as illustrated by the arrows 306. In this manner, the recess 278 is forced against the tube sheet edge 284 creating an airtight seal. For example, during installation, the adjustable band portion 285 (e.g., perforated metal biasing ring) is configured to expand with plastic deformation in a circumferential direction to impart a first radial outward force on the gasket ring/band 283 (e.g., fiber or elastomeric ring), and the gasket ring/band 283 is configured to expand with elastic deformation in the circumferential direction to impart a second outward radial force toward a sealing interface (e.g., tube sheet edge 284) in response to the first radial outward force. Accordingly, the expansion tool 302 may be disposed inside the adjustable band portion 285 (e.g., perforated metal biasing ring), wherein the tool 302 may be actuated to generate a third radial outward force onto the adjustable band portion 285.

In order to expand the expansion tool 302, the system 300 employs a drive 308 that expands and contracts the expansion tool 302. For example, in certain embodiments, the expansion tool 302 may axially align the recess 278 with the edge 284, and then radially expand while maintaining the axial alignment. In other embodiments, the expansion tool 302 may include a tapered shaft (e.g., a conical shaft) or wedge-like tool, which gradually causes radial expansion of the adjustable band 272 during the downward axial movement of the tool 302 in the direction 304. However, any suitable tool 302 may be used to expand and/or contract the adjustable band 272 to fit differently sized apertures 280.

Figure 12:
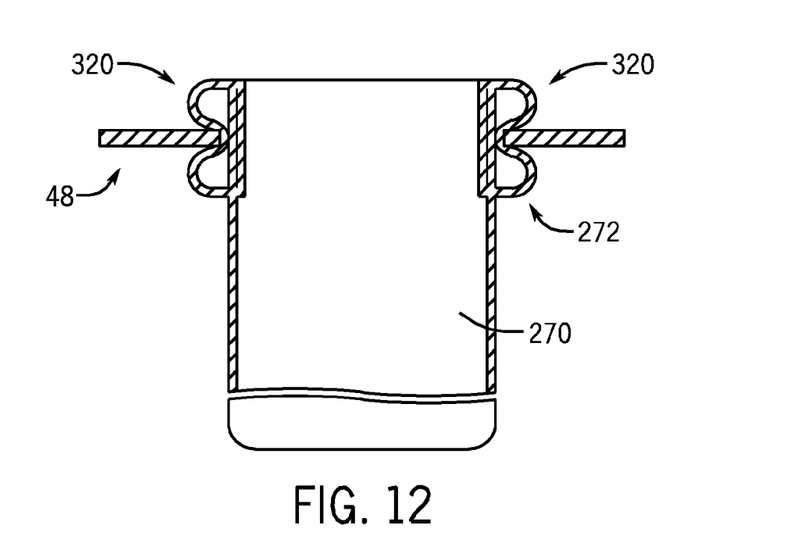
FIG. 12 is a cross-sectional view of an embodiment of the filter bag as illustrated in FIGS. 10 and 11, illustrating the adjustable band expanded into the mounting receptacle in response to the expansive force provided by the expansion tool of FIG. 11.

The expansion tool system 300 may further include a controller 310. The controller 310 controls the expansion of the expansion tool, preventing it from over expanding or under expanding. For instance, if the expansion tool 302 does not properly expand the adjustable band 272, the filter bag 270 may fall out or dislodge easily during use. Likewise, overexpansion of the adjustable band 272 may weaken, crack, and/or tear the adjustable band 272, all of which could lead to premature failure of the filter bag 270. The controller 310 therefore controls the expansion of the tool 302 until sensing a threshold pressure or retention force, thus, ensuring proper expansion of the adjustable band 272. FIG. 12 is a cross-sectional view of an embodiment illustrating an installed filter bag 270. Upon installation, the filter bag 270 creates an air tight seal 320 with the adjustable band 272 in aperture 280 of the tube sheet 48.

Figure 13:
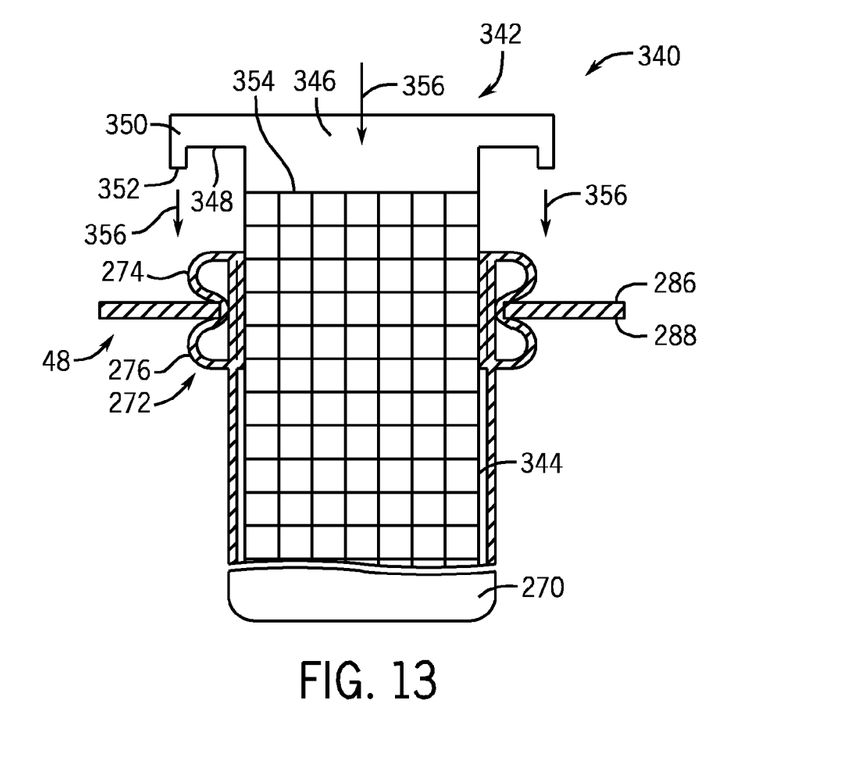
FIG. 13 is a cross-sectional view of an embodiment of an internal cage exploded from an interior of the filter bag as illustrated in FIG. 12.

FIG. 13 is a cross-sectional view of an embodiment of a cage system 340 being lowered into the installed filter bag 270 in FIG. 12. The cage system 340 includes a cage cover 342 and a cage 344. The cage cover 342 defines a body 346, an annular channel 348, and an annular protrusion or lip 350. The protrusion 350 further defines an annular contact face 352. The cage cover 342 and cage 344 join at an interface 354, wherein the cage cover 342 ends and the cage 344 begins. In the present embodiment, the cage 344 is made out of metal and forms a grid-like pattern. In other embodiments, the cage 344 material may be a plastic grid, a fiber grid, a composite grid, or another cage-like structure of a rigid material. Furthermore, the cage 344 may include a variety of patterns and shapes other than that illustrated in FIG. 13 (e.g., circular shapes, diamond, rectangular, etc.).

As illustrated in FIG. 13, the cage system 340 is being lowered into the filter bag 270 in the direction of arrow 356. As the cage system 340 is lowered, the cage 344 enters and fills out the filter bag 270. The cage system 340 continues this downward movement until the contact face 352 contacts the top surface 286 of the tube sheet 48. Thus, the cage cover system 340 rests on the top surface 286 of the tube sheet 48 and the adjustable band 272 fits within the channel 348.

Figure 14:
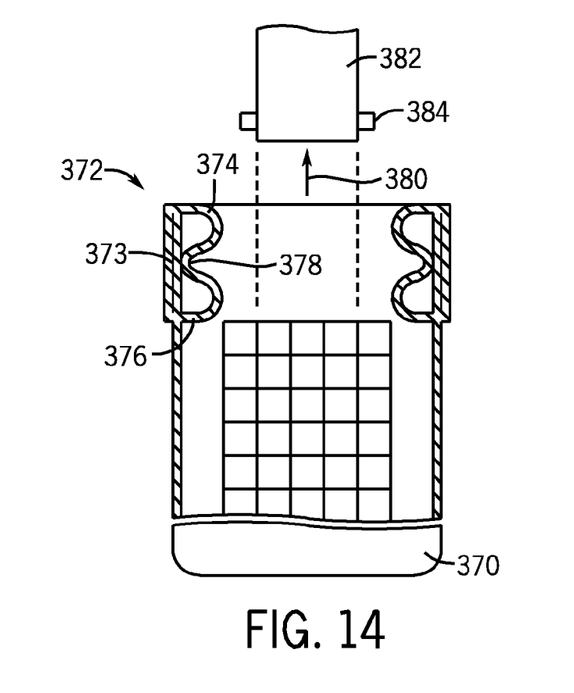
FIG. 14 is a cross-sectional view of an embodiment of a filter bag with an adjustable band exploded from an internal mount (e.g., tubing) prior to contraction of the adjustable band about the internal mount.

FIG. 14 is a cross-sectional view of an embodiment of a filter bag 370 with an adjustable band 372 exploded from an internal mount (e.g., tube or pipe 382) prior to contraction of the adjustable band 372 about the internal mount. The filter bag 370 includes the adjustable band 372, which contracts rather than expands in order to create an airtight seal. As illustrated, the adjustable band 372 includes an adjustable band portion 373, which may be a perforated metal band made of a soft annealed stainless steel or another suitable metal. Similar to the discussion above, the adjustable band 372 defines two protrusions 374 and 376 and a recess 378. In the present embodiment, the filter bag 370 is raised in direction 380 to cover pipe 382. The filter bag 370 continues in direction 380 until the recess 378 aligns with a protrusion 384 on the pipe 382 (in some embodiments the protrusion may be an annular ring). In the illustrated embodiment, the pipe 382 is undersized relative to the adjustable band 372, which can be contracted via deformation onto the pipe 382 to create an airtight seal.

Figure 15:
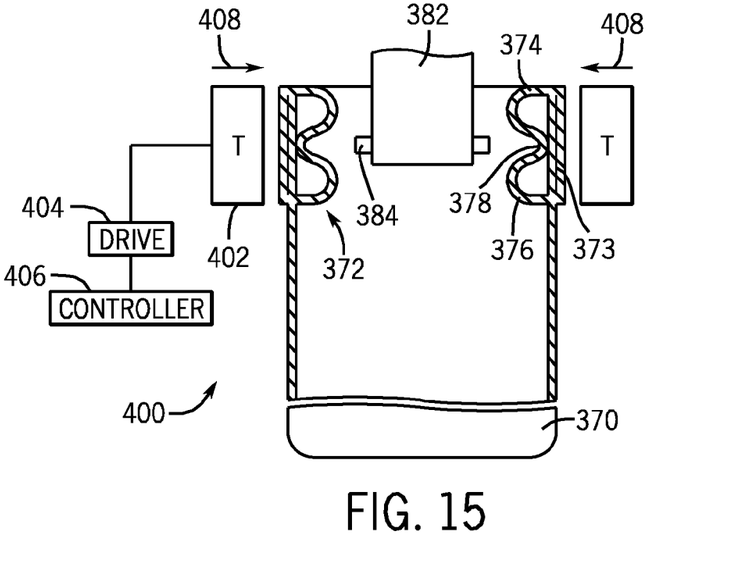
FIG. 15 is a cross-sectional view of an embodiment of the filter bag as illustrated in FIG. 14, illustrating a contraction tool used to contract the adjustable band about the internal mount.

FIG. 15 illustrates the installation of the filter bag 370 in FIG. 14 that employs an adjustable band 372. As illustrated in FIGS. 14 and 15, the filter bag 370 is larger than the pipe 382. Accordingly, the adjustable band 372 is included with the filter bag 370 to enable contraction of the adjustable band 372 about the pipe 382. Once the filter bag 370 is in the proper position, i.e. the recess 378 is aligned with the protrusion 384, a tool system 400 contracts the adjustable band 372. The tool system 400 includes a tool 402, a drive 404, and a controller 406. The tool 402 is designed to plastically deform the adjustable band portion(s) 373. The tool 402 plastically deforms the adjustable band 372 in an inward radial direction as illustrated by the arrows 408. In this manner, the recess 378 contacts the protrusion 384 creating an airtight seal.

The controller 406 controls the expansion and contraction of the tool 402 through the drive 404, preventing it from over contracting or under contracting. For instance, if the tool 402 does not properly contract the adjustable band 372, the filter bag 370 may fall off or dislodge easily during use of the filter bag 370. Likewise, over contraction of the adjustable band 372 may weaken, crack, or tear the adjustable band 372, all of which could lead to premature failure of the filter bag 370. The controller 406 may therefore control the contraction of the tool 402 until sensing threshold pressure or retention force, ensuring proper contraction of the adjustable band 372.

Technical effects of the invention include a filter bag with an adjustable band capable of sealing a range of differently sized holes. Thus, the adjustable band allows for a single size of filter bag to take the place of multiple bag sizes. Furthermore, a tool is included that properly expands or contracts the adjustable band creating a proper seal around the differently sized holes, without damaging the adjustable band or allowing easy dislodgement of the filter bag. In certain embodiments, the adjustable band includes an adjustable band portion made of a perforated metal, such as a dead soft annealed stainless steel, annealed low carbon steel, or aluminum.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a filter assembly, comprising:
  a filter bag having an opening; and
  a seal integral to the filter bag adjacent the opening, wherein the seal comprises a hollow gasket ring and a mesh metal band, wherein the hollow gasket ring is made of an elastomeric material, and the mesh metal band is configured to bias the hollow gasket ring in a radial direction into a sealed position upon plastic expansion or plastic contraction of the mesh metal band.

2. The system of claim 1, wherein the mesh metal band is configured to expand or contract the seal to fit a plurality of different sized filter connections.

3. The system of claim 1, wherein the hollow gasket ring is disposed about the mesh metal band.

4. The system of claim 1, wherein the mesh metal band is disposed about the hollow gasket ring.

5. The system of claim 1, wherein the hollow gasket ring and the mesh metal band are concentric with one another.

6. The system of claim 1, wherein the mesh metal band comprises a uniform pattern configured to facilitate plastic expansion or plastic contraction about of openings in a metal substrate.

7. The system of claim 1, comprising a second perforated metal band configured to bias the hollow gasket ring in the radial direction into the sealed position upon plastic expansion or plastic contraction of the second perforated metal band.

8. A method, comprising:
expanding or contracting a seal integral to of a filter bag adjacent an opening in the filter bag, wherein the seal comprises a metal mesh ring and a hollow gasket ring, and wherein expanding or contracting the seal comprises plastically deforming the metal mesh ring with plastic deformation in a circumferential direction to impact a first radial force, and
expanding or contracting the hollow gasket ring of the filter bag with elastic deformation in the circumferential direction to impart a second radial force toward a sealing interface in response to the first radial force.

9. The method of claim 8, comprising inserting a tool inside the opening in the filter bag, and actuating the tool to generate a third radial force onto the mesh metal ring.

10. The method of claim 9, comprising controlling the tool to vary the third radial force to adjust expansion of the mesh metal ring and the hollow gasket ring to fit a plurality of different sized openings having the sealing interface.

11. The system of claim 1, wherein the seal is an annular seal coupled to the filter bag around the opening, the hollow gasket ring is generally concentric with the mesh metal band, the mesh metal band is configured to expand with plastic deformation in a circumferential direction to impart a first radial outward force on the hollow gasket ring, and the hollow gasket ring is configured to expand with elastic deformation in the circumferential direction to impart a second outward radial force toward a sealing interface in response to the first radial outward force.

12. The system of claim 1, wherein the filter assembly is a pulse jet filter assembly, and the filter bag is a pulse jet filter bag.

13. The system of claim 1, wherein the hollow gasket ring comprises a plurality of pockets on an outer circumference.

14. The system of claim 1, wherein the hollow gasket ring comprises a plurality of pockets on an inner circumference.

15. The system of claim 1, comprising a tool configured to plastically expand or contract the mesh metal band to form a sealing engagement with the seal.

16. The system of claim 15, comprising a drive configured to expand or contract the expansion tool and a controller configured to control the drive.

17. The system of claim 1, wherein the mesh metal band rests within the hollow gasket ring.

18. A system, comprising:
a filter bag having an opening; and
a seal integral to the filter bag adjacent the opening, wherein the seal comprises a hollow gasket ring and a mesh metal band, wherein the hollow gasket ring is made of an elastomeric material that completely surrounds the mesh metal band, and the mesh metal band is configured to bias the hollow gasket ring in a radial direction into a sealed position upon plastic expansion or plastic contraction of the mesh metal band.

19. The system of claim 18, comprising a perforated metal band concentric with the mesh metal band and configured to bias the hollow gasket ring in the radial direction into the sealed position upon plastic expansion or plastic contraction of the perforated metal band.

20. The system of claim 18, wherein the mesh metal band comprises diamond shaped apertures oriented in a radial direction to facilitate plastic expansion or contraction in the radial direction.

21. The system of claim 18, comprising a tool configured to plastically expand or contract the mesh metal band to form a sealing engagement with the seal.

22. The system of claim 21, comprising a drive configured to expand or contract the expansion tool and a controller configured to control the drive.

* * * * *